United States Patent [19]

Aichele et al.

[11] Patent Number: 4,856,850

[45] Date of Patent: Aug. 15, 1989

[54] BRAKING CONTROL SYSTEM FOR A TRAILER

[75] Inventors: William H. Aichele; James O. Hopkins, Jr.; Dale H. Krauskopf, all of Fort Wayne, Ind.

[73] Assignee: EPCO Products, Inc., New Haven, Ind.

[21] Appl. No.: 205,568

[22] Filed: Jun. 3, 1988

Related U.S. Application Data

[63] Continuation of Ser. No. 920,569, Oct. 17, 1986, abandoned.

[51] Int. Cl.$^4$ .................... B60T 13/66; F16D 65/36
[52] U.S. Cl. ........................................ 303/20; 303/15; 188/156
[58] Field of Search .................. 303/6.01, 7, 9.63, 20, 303/22.1, 22.4; 188/3 A, 156, 158

[56] References Cited

U.S. PATENT DOCUMENTS

| | | | |
|---|---|---|---|
| 3,046,470 | 7/1962 | Blocher, Jr. | 323/22 |
| 3,141,530 | 7/1964 | Morley | 188/163 |
| 3,371,253 | 2/1968 | Hubbard | 317/130 |
| 3,423,135 | 1/1969 | Beltramo | 303/3 |
| 3,497,266 | 2/1970 | Umpleby | 303/3 |
| 3,503,652 | 3/1970 | Broek | 303/3 |
| 3,538,392 | 11/1970 | Carmichael | 317/148.5 |
| 3,574,414 | 4/1971 | Jacob | 303/7 |
| 3,610,699 | 10/1971 | Ladoniczki | 303/7 |
| 3,738,710 | 6/1973 | Pokrinchak et al. | 303/20 |
| 3,780,832 | 12/1973 | Marshall | 188/3 R |
| 3,856,362 | 12/1974 | Howard | 303/7 |
| 3,861,489 | 1/1975 | Lang et al. | 180/103 |
| 3,870,981 | 3/1975 | Patzke et al. | 188/158 |
| 3,895,683 | 7/1975 | Lang et al. | 180/103 |
| 3,897,979 | 8/1975 | Vangalis et al. | 303/24 BB |
| 3,909,075 | 9/1975 | Pittet, Jr. et al. | 303/24 C |
| 3,953,084 | 4/1976 | Pittet, Jr. et al. | 303/24 R |
| 3,967,863 | 7/1976 | Tomecek et al. | 303/24 C |
| 3,981,542 | 9/1976 | Abrams et al. | 303/20 |
| 3,993,362 | 11/1976 | Kamins et al. | 303/21 BE |
| 4,023,864 | 5/1977 | Lang et al. | 303/20 |
| 4,033,630 | 7/1977 | Hubbard | 303/7 |
| 4,076,327 | 2/1978 | Hubbard | 303/20 |
| 4,254,998 | 3/1981 | Marshall et al. | 303/20 |
| 4,295,687 | 10/1981 | Becker et al. | 303/20 |
| 4,398,252 | 8/1983 | Frait | 303/20 |
| 4,721,344 | 1/1987 | Frait et al. | 303/7 X |

*Primary Examiner*—Andres Kashnikow
*Assistant Examiner*—Timothy Newholm
*Attorney, Agent, or Firm*—Jeffers, Hoffman & Niewyk

[57] ABSTRACT

The trailer brake control system for use in a trailer which is adapted to be towed by a towing vehicle. The trailer includes an electrically operated braking mechanism and the towing vehicle includes a brake pedal, at least one brake light, and a brake switch operated by the brake pedal to energize the brake light. The control system includes a short circuit indicator circuit to provide a short circuit signal when a short circuit condition is detected in the trailer brake mechanism. A manual switch is also provided to manually actuate the trailer brake mechanism and to provide a manual brake actuation signal. A second circuit including a NOR gate provides a variable amplitude brake actuation signal in response to the concurrent closure of the brake switch, the absence of a manual brake actuation signal, and the absence of a short circuit signal. An indicator light is responsive to the brake actuation signal to provide a signal indicative of brake actuation. An oscillator circuit provides a stream of pulses and a voltage comparator is responsive to the stream of pulses and to the variable amplitude brake actuation signal to provide a stream of variable width drive pulses. The drive pulses drive an electronic switch to cyclically and repetitively actuate the trailer brake mechanism thereby applying braking force to the brakes of the trailer.

8 Claims, 3 Drawing Sheets

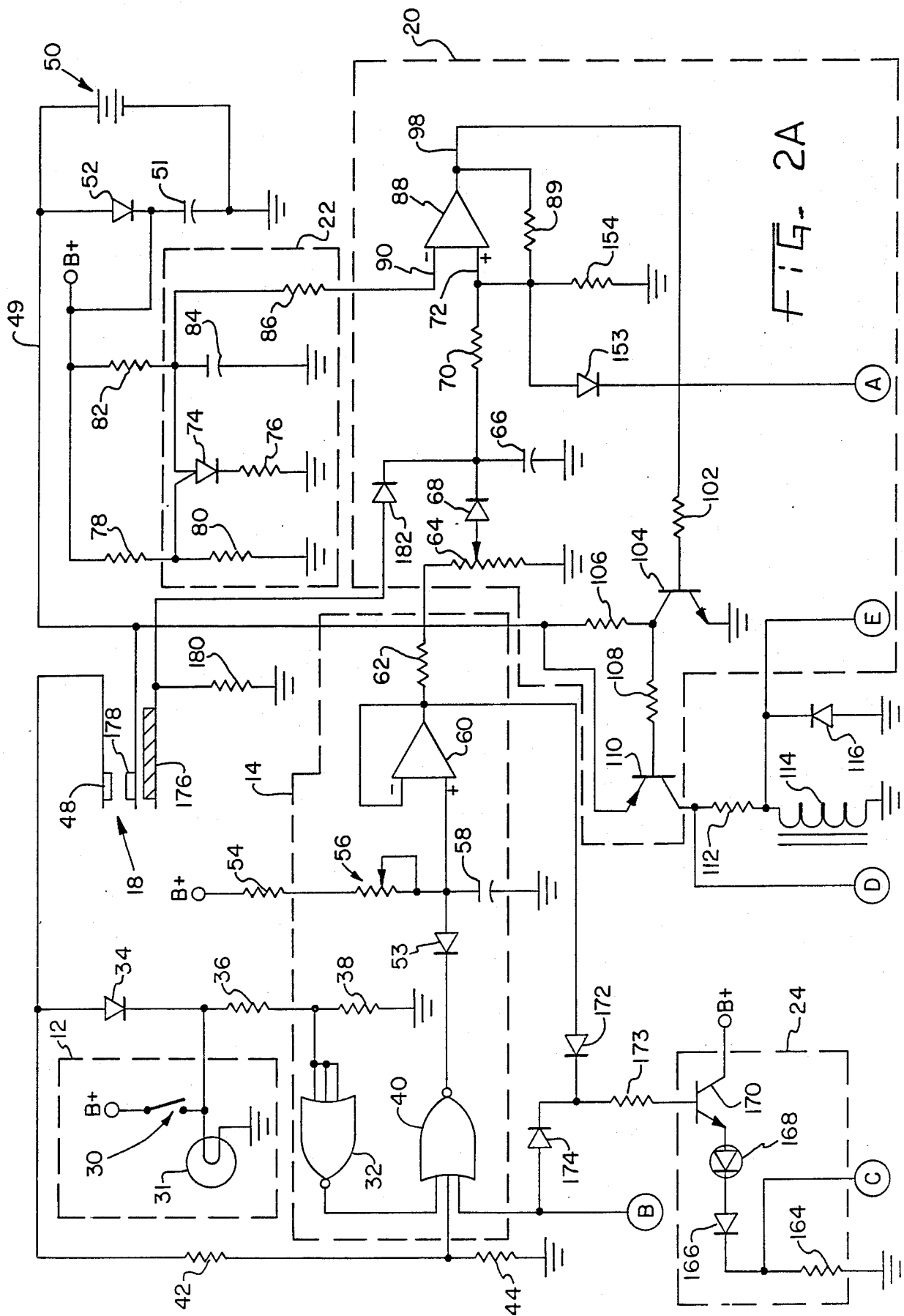

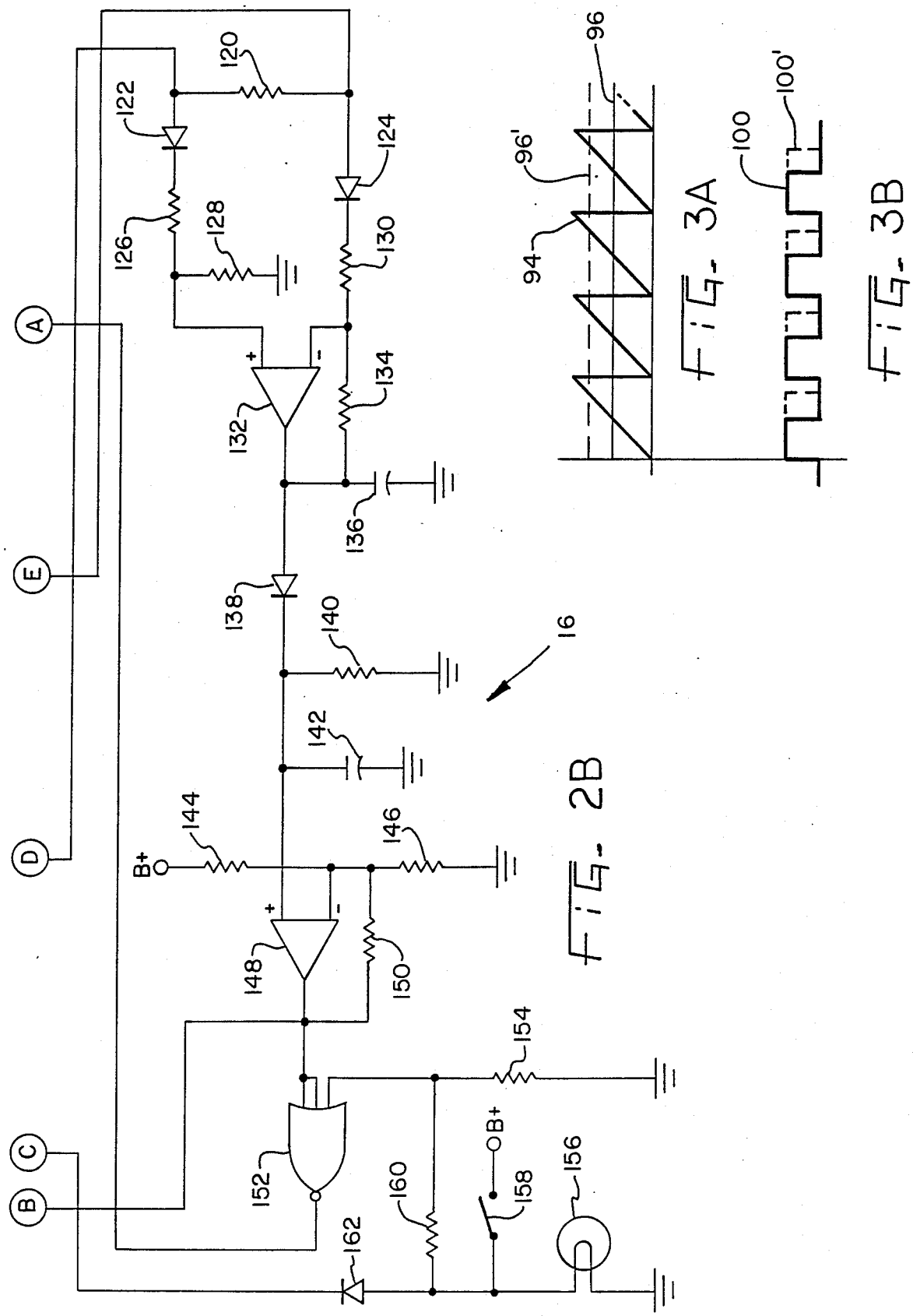

BRAKING CONTROL SYSTEM FOR A TRAILER

This is a continuation of application Ser. No. 920,569, filed Oct. 17, 1986, abandoned.

BACKGROUND OF THE INVENTION

This invention relates to braking systems for trailers and, more particularly, to systems for controlling the operation of the brakes of a trailer. Trailers, such as mobile homes, campers, boat trailers and the like, which are towed behind a towing vehicle such as, for instance, an automobile, conventionally employ electrical brakes which are actuated by electrical interconnection with the electrical brake control system of the towing vehicle. Thus, as the driver of the towing vehicle operates the towing vehicle brakes by depressing the brake pedal, the electrical brake system of the trailer is simultaneously operated.

Control systems for electrically controlling the brakes of a trailer are shown in U.S. Pat. No. 3,780,832 and U.S. Pat. No. 4,254,998, which patents are assigned to the assignee of the present invention and which are incorporated herein by reference. In general, the systems described in the above-identified patents operate by electrically interconnecting the pedal-operated brake switch with the trailer brake control system. The switch operates the towing vehicle brake lights, and, therefore, provides an indication that the towing vehicle brake pedal has been depressed. These prior art systems also provide for the gradual application of braking force to the trailer brakes so that, when the brake pedal of the towing vehicle is depressed, the control system automatically and gradually applies power to the trailer brakes. However, these prior art control systems do not provide an indication to the driver of the vehicle of the amount of braking force which is being applied to the trailer brakes. It is, therefore, desired to provide a control circuit wherein a perceptible indication is provided of the braking force which is being applied to the trailer brakes.

Prior art brake control systems have also included short circuit protection whereby, despite actuation of the towing vehicle brake pedal, no braking force will be applied to the trailer brakes when an electrical short circuit or overload condition exists in the trailer braking system and whereby the trailer brake control system is disabled to prevent damage to the electrical circuit components. However, these prior art control systems do not provide an indication to the driver of the towing vehicle that such an overload or short circuit condition has developed. It is, therefore, desired to provide a control system whereby a perceptible, i.e., visible or audible, indication is provided to the driver of the towing vehicle that a short circuit or overload situation has occurred in the electrical circuit of the trailer brake control system.

Another problem with the prior art trailer brake control systems has been that the systems and electronic circuits therefor have been relatively complicated. The electronic circuits conventionally have used discrete circuit components which are arranged in an analog-type of electrical circuit. It is desired to provide a simplified digital type of trailer brake control electrical circuit wherein the trailer brakes are actuated by a train of pulses whose width is varied in accordance with the amount of braking force to be applied to the trailer brakes.

Prior art control systems have also provided for adjustment of the amount of braking force to be applied to the trailer brakes to account for weight variation in trailers. However, in some prior art trailer brake control systems, such adjustment has been effected by means of liquid sensitive switches, such as mercury switches. Such switches are also sensitive to the variation in road grade so that the braking force applied to the trailer brakes would vary as a function of the grade of the road being travelled. It is, therefore, desired to provide a trailer brake control system which is not affected by the up or down grade of a road.

SUMMARY OF THE INVENTION

The present invention overcomes the disadvantages of the above-described prior art trailer brake control systems by providing an improved trailer brake control system therefor.

The trailer brake control system of the present invention, in one form thereof, includes a circuit which is responsive to the actuation of the towing vehicle brake pedal and in response thereto provides a brake actuation signal. The control system further provides an oscillator circuit which provides a stream of output pulses. A voltage comparator is provided with both the brake actuation signal and the stream of pulses to generate a stream of modulated pulses whose widths are varied in accordance with the amplitude of the trailer brake actuation signal. The modulated pulses are used to drive an electronic switch so that the trailer brakes are cyclically energized for periods of time which vary in accordance with the widths of the modulated pulses. Thus, the average power applied to the trailer brakes is varied in accordance with the amplitude of the brake actuated signal. The system also includes an indicator to indicate to the driver of the towing vehicle the intensity of the brake force which is being applied.

The trailer brake control system in accordance with the present invention, in one form thereof, further provides a first circuit which is responsive to an overload or short circuit condition in the trailer brake electrical wiring system and which provides a short circuit signal in response thereto. The control system also includes an indicator which is responsive to the short circuit signal for providing an intermittent perceptible indication signal to indicate the short circuit or overload condition. In addition, the short circuit signal disables the control system from applying power to the trailer brakes.

One advantage of the trailer brake control system according to the instant invention is that a perceptible, i.e., visible or audible, indication is provided for the driver of the towing vehicle to alert him that a short circuit or overload condition exists in the wiring of the trailer brake control system.

Another advantage of the trailer brake control system according to the instant invention is that the driver of the towing vehicle is warned by means of a flashing light that a short circuit or overload condition has developed in the electrical circuit of the trailer brake system.

A further advantage of the circuit according to the present invention is that a perceptible, i.e., visible or audible, indication is provided to the driver of the towing vehicle of the amount of braking force which is being applied to the trailer brakes.

Yet another advantage of the present invention is that the adjustment of the system for trailer weight is not affected by the up or down grade of the road.

A still further advantage of the present invention is that maximum braking force is maintained on the trailer brakes when the towing vehicle and the trailer come to a stop and the towing vehicle brake pedal remains depressed.

A still further advantage of the present invention is that the trailer brakes will be automatically disabled when the towing vehicle is shifted into reverse gear.

The present invention, in one form thereof, provides a trailer brake control system for use in a trailer which is adapted to be towed by a towing vehicle. The trailer includes an electrically operated brake mechanism and the towing vehicle includes a brake pedal, at least one brake light, and a brake switch operated by the brake pedal to energize the brake light. The control system includes a short circuit indicator to provide a short circuit signal when a short circuit condition is detected in the trailer brake mechanism. A manual switch is provided for manually actuating the trailer brake mechanism and for providing a manual brake actuation signal. A circuit is provided for providing a variable amplitude brake actuation signal in response to the concurrent closure of the brake switch, absence of a manual brake actuation signal, and absence of a short circuit signal. An indicator is provided which is responsive to the brake actuation signal for providing a perceptible brake actuation indication signal. An oscillator provides a stream of pulses and a voltage comparator is responsive to the stream of pulses and the variable amplitude brake actuation signal to provide a stream of variable width drive pulses. A switch is responsive to the stream of variable width drive pulses to cyclically and repetitively actuate the trailer brake mechanism, thereby applying braking force to the brakes of the trailer.

The present invention, in one form thereof, provides a control system for an electrically operated brake mechanism of the trailer, the trailer being adapted to be towed by a towing vehicle. The towing vehicle includes a switch responsive to actuation of the brake pedal of the towing vehicle for providing a brake pedal actuation signal. The control system includes a first circuit responsive to the brake pedal actuation signal to provide a trailer brake actuation signal. An oscillator circuit provides a stream of output pulses, and a second circuit is responsive to both the oscillator circuit and the first circuit for cyclically applying power to the brake mechanism of the trailer.

The present invention, in one form thereof, still further provides a trailer brake control system for use in a trailer which is adapted to be towed by a towing vehicle. The trailer includes an electrically operated brake mechanism. The towing vehicle includes a brake pedal, a brake switch operated by the brake pedal and at least one brake light actuated by the brake switch. The control system includes a circuit responsive to a short circuit condition in the trailer brake mechanism to provide a short circuit signal. An indicator is responsive to the short circuit signal to provide an intermittent perceptible indication signal. A brake actuation circuit is responsive to operation of the brake switch to operate the trailer brake mechanism.

It is an object of the present invention to provide a trailer brake control system including an indicator device which provides a perceptible indication to the driver of the towing vehicle of the amount of braking force which is being applied to the trailer brakes.

Another object of the present invention is to provide a trailer brake control system including an indicator device which provides a perceptible visible or audible indication to the driver of the towing vehicle that a short circuit or overload condition has developed in the trailer brake wiring system.

Still another object of the present invention is to provide a trailer brake control system wherein width modulated pulses are generated for actuation of the trailer brakes.

A yet further object of the present invention is to provide a trailer brake control system wherein the braking power adjustment for trailer weight is not affected by the road grade.

A still further object of the present invention is to provide a trailer brake control system which is disabled when a short circuit or overload condition develops in the trailer brake mechanism.

A yet still further object of the present invention is to provide a trailer brake control system wherein the maximum adjusted braking force is maintained when the towing vehicle brakes are actuated and the towing vehicle comes to a stop.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein:

FIG. 2a and 2b are schematic diagrams of the control system of FIG. 1; and

FIG. 3a and 3b are wave shapes of electrical signals developed in the system of FIG. 1.

Corresponding reference characters indicate corresponding parts throughout the several views of the drawings.

Figure 1:
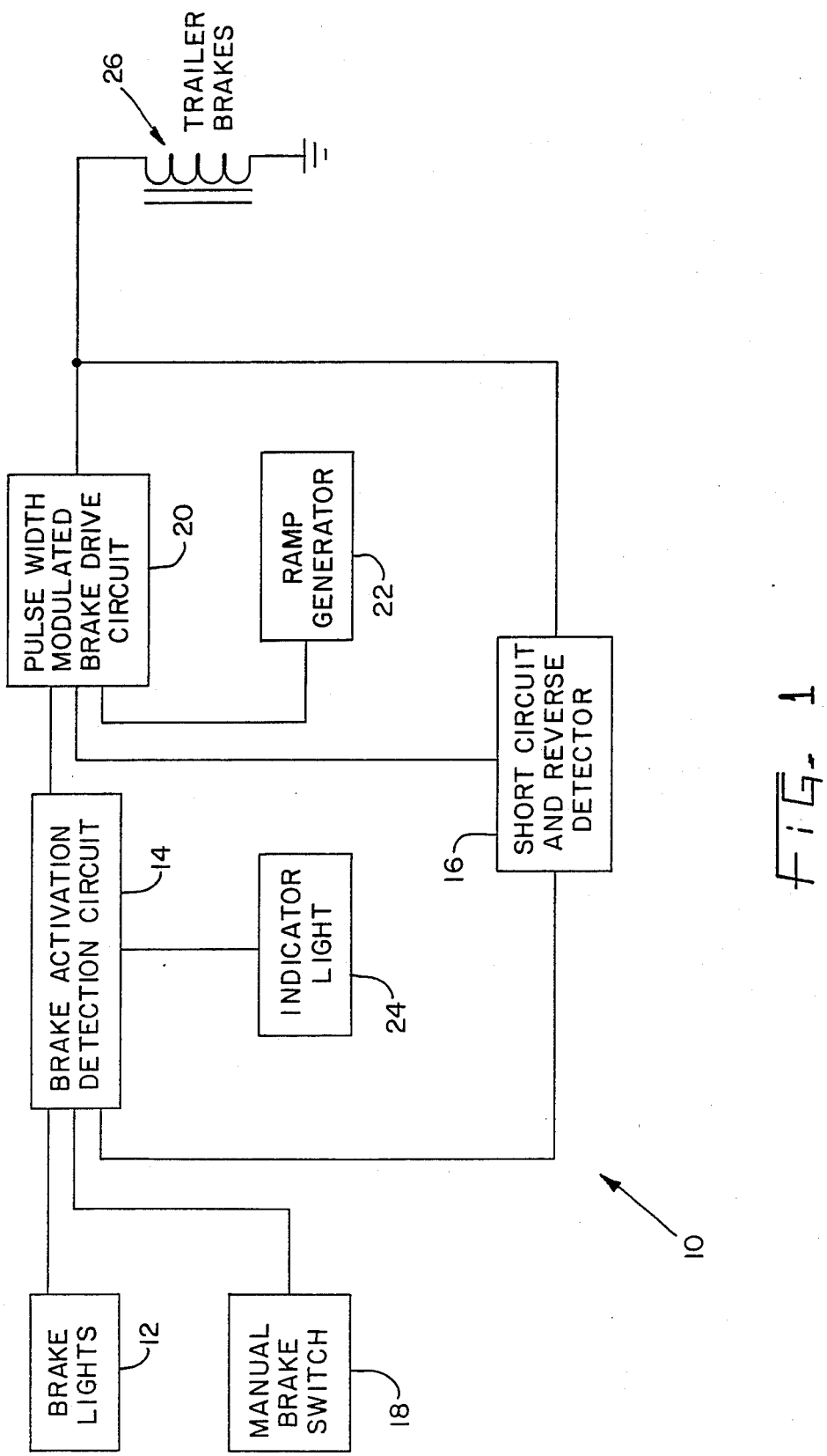
FIG. 1 is a block diagram of a preferred embodiment of the invention.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring to FIG. 1, there is shown a block diagram of a preferred embodiment of the invention. The brake lights of the towing vehicle are shown at 12 and are shown connected to a brake activation detection circuit 14. The brake activation detection circuit 14 also receives inputs from a manual brake switch 18 and from a short circuit and reverse detector circuit 16. Brake activation detection circuit 14 provides an output to a pulse width modulated brake drive circuit 20 and to a trailer brake indicator light 24. Pulse width modulated brake drive circuit 20 receives an input from both short circuit and reverse detector 16 and ramp generator 22. Pulse width modulated brake drive circuit 20 provides an output to the trailer brakes 26 and to short circuit and reverse detector 16.

Referring now to FIGS. 2a and 2b, brake light circuit 12 is shown at the top left-hand portion of FIG. 2a and comprises brake lights 31 and a single pole, single throw brake switch 30 which is actuated by the brake pedal of the towing vehicle (not shown). Thus, when switch 30 is closed, brake lights 31 will be energized from DC power source B+. The voltage appearing across brake lights 31 will also be applied to a point intermediate a diode 34 and a resistor 36. Resistor 36 forms part of a resistive divider circuit including resistors 36 and 38. The junction point between resistors 36 and 38 is connected to a NOR gate 32 which is connected as an inverter. Therefore, when a positive voltage is applied to the input of inverter 32, the output will be low. This output is connected to a NOR gate 40. NOR gates 32 and 40 may be of the type 4025. NOR gate 40 also receives two other inputs. One input is provided from switch contact 48 of manual brake switch 18 by way of the resistive divider comprising resistors 42 and 44. Thus, when manual brake switch 18 is closed, power is supplied to contact 48 by way of lead 49 from vehicle battery 50. Vehicle battery 50 also provides power through diode 52 to capacitor 51 to provide the filtered DC supply indicated at B+.

The third input to NOR gate 40 is derived from short circuit and reverse detector circuit 16 shown in FIG. 2b and discussed in detail hereinbelow. For purposes of discussion, assume that all inputs to NOR gate 40 are low, thereby indicating that manual brake switch 18 is not actuated, that no short circuit or overload condition exists in the trailer brake system 26, and that switch 30 is closed because the brake pedal of the towing vehicle has been depressed. The output of NOR gate 40 will, therefore, go high, thereby reverse biasing diode 53 and preventing further flow of current from the B+ supply through resistor 54, potentiometer 56 and diode 53. This enables capacitor 58 to charge up at a rate determined by the values of resistor 54, potentiometer 56 and capacitor 58. The rate at which capacitor 58 charges may be varied by adjusting potentiometer 56. The rate at which capacitor 58 charges effects the rate at which power is applied to the trailer brakes after the towing vehicle brake pedal is depressed. Thus, if maximum resistance is presented by potentiometer 56, the rate at which braking power will be applied to the trailer brakes will be quite gradual as compared to when minimum resistance is presented by potentiometer 56.

The voltage on capacitor 58 is presented to one of the inputs of an operational amplifier 60 which is connected as a voltage follower. Therefore, the voltage at the output of operational amplifier 60 will follow the ramp voltage appearing across capacitor 58. This voltage is applied through a voltage divider including resistor 62 and potentiometer 64 via blocking diode 68 to a capacitor 66 which is charged thereby. Potentiometer 64 is used to compensate for the weight of the trailer. Thus, if a relatively heavy trailer is used, the braking force which is applied should be relatively high. Therefore, potentiometer 64 is adjusted for maximum resistance whereby maximum voltage appears on capacitor 66. If a lightweight trailer is used, less braking force is needed, and, therefore, potentiometer 64 is adjusted for less resistance, thus causing a lower voltage to appear on capacitor 66. The voltage appearing across capacitor 66 is applied by a resistor 70 to an input 72 of a comparator 88.

Since the weight control potentiometer 64 for adjusting the brake circuit for varying weights of the trailer is not dependent upon mercury switches or other liquid-type switches, the instant brake control is also not sensitive to the grade of the road on which the trailer is being towed.

Comparator 88 also receives an input from a ramp generator circuit 22 on input lead 90. Ramp generator circuit 22 includes a unijunction transistor 74 of the type 2N6028 which is connected to ground by way of a resistor 76. The gate of unijunction transistor 74 is supplied by means of a voltage divider consisting of resistor 78 and 80. A capacitor 84 is charged by way of resistor 82 from the B+ voltage supply. Thus, as the voltage across capacitor 84 increases in ramp fashion, unijunction transistor 74 will be fired when the voltage across capacitor 84 reaches the predetermined level set by resistor 78 and resistor 80. Unijunction transistor 74 will, therefore, discharge capacitor 84 through resistor 76 to ground. Thus, the voltage appearing across capacitor 84 will be a sawtooth wave and this voltage is presented by way of resistor 86 to input 90 of comparator 88. In FIG. 3a, the wave shape appearing at lead 90 is shown at 94 and comprises a sawtooth wave. The frequency of the sawtooth wave may be approximately 100 hz. The wave shape appearing on lead 72 has been indicated at 96. For purposes of explanation, wave shape 96 is shown as a steady state, DC voltage level. In reality, as explained hereinbefore, voltage 96 will be a ramp-shaped voltage which varies much more slowly than the frequency of sawtooth wave 94. Once wave shape 96 has reached its maximum or DC level, it will remain there until the towing vehicle brake pedal is released.

The output of comparator 88 will be high when inputs appear on both leads 72 and 90. Therefore, no output appears once sawtooth wave 94 exceeds voltage 96. Therefore, as shown in FIG. 3b, an output 100 is provided at the output of comparator 88 which comprises a square wave of the same frequency as the sawtooth wave 94 generated by ramp generator 22. It can also be seen that as the voltage 96 increases to 96', shown in dotted lines because of an adjustment in trailer weight compensation potentiometer 64, the width of the pulses of wave shape 100 will increase to 100', shown in dotted lines. Therefore, the width of the pulses 100 is a function of the braking power which is to be supplied to the trailer brakes. Furthermore, as potentiometer 56 is adjusted, the rate at which voltage 96 reaches its maximum value will also vary. Pulse wave 100 is applied by way of resistor 102 to the base of NPN transistor 104 and drives transistor 104 into its saturated state. The collector of transistor 104 is connected by way of a resistor 106 to the positive side of the vehicle battery 50. The collector is also connected by way of a resistor 108 to the base of PNP transistor 110. Thus, as transistor 104 is saturated, the voltage across transistor 104 will be very low and will cause transistor 110 to be saturated so that transistor 110 presents a very low voltage drop. Battery 50, therefore, applies a voltage by way of a resistor 112 to the trailer brakes which are shown at 114.

Thus, transistors 104 and 110 will be alternately driven conductive and non-conductive by wave shape 100 so that pulsed power is applied to trailer brakes 114. The average amount of power applied to brakes 114 will, therefore, depend on the width of the pulses. Thus, when control 64 is set for a heavily loaded trailer, the pulse width of pulses 100 will be greater and, therefore, the average amount of power applied to the trailer brakes will be relatively great. On the other hand, if control 64 is adjusted for a lightweight trailer, pulses 100 will be relatively narrow and a relatively low average amount of power will be applied to the vehicle brakes. The coils 114 of the trailer brakes integrate the applied power pulses because of the coil inductance. However, because of the relatively steep sides of pulses 100, negative power spikes will also be generated across coils 114. The negative spikes will be clipped off by diode 116, thereby, eliminating the fly back effect of brake coils 114. The current conducted by resistor 112 provides an indication of the amount of power supplied to the trailer brakes.

Turning now to FIG. 2b, it is shown that resistor 112 is connected in parallel with resistor 120. The voltage across current sensing resistors 112 and 120 is applied, by way of blocking diodes 122 and 124 and resistors 126 and 130, to the inputs of differential amplifier 132. Resistor 128 is part of the resistive divider circuit for one of the inputs of differential amplifier 132. Resistor 134 and capacitor 136 provide filtering for the other input of differential amplifier 132. The output of differential amplifier 132 is applied, by way of a diode 138, to a filtering circuit comprising a resistor 140 and a capacitor 142. The filtered voltage across capacitor 142 is an indication of the average power applied to the trailer brake coils 114. If an overload situation occurs in the trailer brake circuit or if a short occurs in the trailer brake wiring, the amount of current conducted by resistor 112 to trailer brake coils 114 will be very high. Therefore, a high voltage will be presented across resistors 112 and a high voltage will appear across capacitor 142.

The voltage across capacitor 142 is presented to an input of a comparator 148. Comparators 88 and 148, differential amplifiers 132 and voltage follower 60 are all integrated circuits of the type LM2902. The other input for comparator 148 is derived from a resistive divider including resistors 144 and 146. Resistor 150 is part of the biasing circuit for comparator 148. Thus, if the amount of current sensed by resistor 112 exceeds a predetermined level determined by the values of resistors 144 and 146, the output of comparator 148 will be high. This high output is presented by way of terminal B to the input of NOR gate 40 and will thereby prevent NOR gate 40 from providing a brake actuation signal, thereby preventing transistor 110 from providing power to trailer brake coils 114.

Continuing now with FIG. 2a, the output of voltage follower 60 is connected by way of a diode 172 and a resistor 173 to the base of an NPN transistor 170. Transistor 170 has its collector connected to the B+ supply and drives a light emitting diode (LED) 168 by way of a diode 166 and a resistor 164. Diode 168 may be of the type 550-2406, manufactured by Dialight. Thus, when a voltage appears at the output of voltage follower 60, LED 168 will be driven, thereby emitting an amount of light depending upon the amount of voltage present at the output of voltage follower 60. Thus, as the brake pedal (not shown) of the towing vehicle is depressed and switch 30 closes, the voltage rises in ramp fashion on capacitor 58 and the light emitted by LED 168 will provide a visible indication of the amount of braking power which is being applied to the vehicle brake coils 114. Furthermore, when a short circuit or overload condition is sensed by the short circuit detector, circuit 14 and NOR gate 40 is disabled by comparator 148, no further power is supplied to the brake coils by circuit 20 or to LED 168 by voltage follower 60. Comparator 148 is also connected by way of a diode 174 and resistor 173 to the base of driving NPN transistor 170 for LED 168.

Thus, when a high voltage appears at the output of comparator 148, indicating that a short circuit condition exists, diode 174 is forward driven thus causing LED 168 to emit light. The output of comparator 148 is also provided to a NOR gate 152. Thus, the output of NOR gate 152, due to the high input from comparator 148, will be low. The output NOR gate 152 is connected by way of a diode 153 to input 72 of comparator 88. When the output of NOR gate 152 goes low, diode 153 will be forward biased and will cause input 72 of comparator 88 to go low. Thus, comparator 88 is prevented from providing drive on output 98 to power transistors 104 and 110 to drive brake coils 114. Current sensing resistor 112, therefore, senses that no current is applied to brake coils 114. Thus, comparator 148 will receive no input from differential amplifier 132, and the output of differential amplifier 148 will go low. This in turn will take away the drive of LED driving transistor 170 to diode 174, and LED 168 will, therefore, turn off and no light will be emitted thereby. At the same time, the low signal provided to NOR gate 40 will enable NOR gate 40 to provide a high input on its output and will enable capacitor 58 to charge up again. Furthermore, NOR gate 152 will no longer forward bias diode 153 and will enable an output to be generated on output 98 of comparator 88. Power will, therefore, again be provided to brake coils 114. This in turn will cause an excessive amount of current which will be sensed by comparator 148, therefore, again presenting a high output value on the output of comparator 148, which in turn will again turn off NOR gate 40 and will turn on LED 168, and will turn off comparator 88. Thus, in case of a short circuit or overload condition in the trailer brake circuit, LED 168 will be alternately driven on and off and will, therefore, flash to alert the driver of the vehicle that a short circuit condition exists. In the disclosed embodiment, the light will flash at a rate of approximately ¼hz. The flashing of LED 168 alerts the driver of the towing vehicle that a short circuit or overload condition exists in the trailer brake system.

It should also be noted that the LED flashing light which provides a perceptible indication of both the amount of braking power which is being applied and of the existence of a short or overload condition in the wiring, may be replaced with a device which emits an audible signal wherein the intensity of the sound depends upon the amount of brake power applied and wherein the audible signal will be turned on and off cyclically upon the occurrence of a short circuit condition as described above.

Another input is provided for NOR gate 152 by the switch 158 which energizes the backup lights 156 of the towing vehicle. Thus, when power is applied to the backup lights 156 as the vehicle is shifted into reverse, switch 158 will close and a high voltage will appear at the input to NOR gate 152 by way of the resistive divider network consisting of resistors 154 and 160. B+ voltage is also applied by way of switch 158 through a diode 162 to a junction point between diode 166 and 164 in the LED circuit. Thus, by reverse biasing diode 166, transistor 170 can no longer drive LED 168 and the light will turn off when the towing vehicle is shifted into reverse. At the same time, the high input to NOR gate 152 because of the closure of switch 158 will cause the output of NOR gate 152 to go low, thereby forward biasing diode 153 and thereby disabling comparator 88. Thus, no voltage will appear at the output of comparator 88 when the towing vehicle is shifted into reverse, thereby disabling the drive for transistor 110 and preventing further current from flowing to trailer brake coils 114. Thus, whenever NOR gate 152 senses either a trailer brake system overload or short circuit condition or that the towing vehicle has been shifted into reverse, comparator 88 will be shut down and drive will immediately be disabled for transistor 110.

If it is desired to manually actuate the trailer brakes, then manual brake switch circuit 18 is actuated. Switch 18 includes a hand-operated switch which includes two cantilevered spring contacts 48 and 178 which are normally open. A spongy plastic resistance pad 172 is mounted on a stationary rigid backing. Pad 176 is composed of a suitably open-textured, soft, spongy plastic or rubber material such as a foam plastic or foam rubber. Pad 176 is impregnated with electrically conductive powdered graphite which may be incorporated into the body of the pad. Such conductive foams are well known and need not be further disclosed herein. When the manual switch is closed, the amount of voltage presented through contact 178 will depend upon how much pressure is applied to pad 176. In its expanded condition, pad 176 exhibits maximum resistance. As pad 176 is progressively compressed by forceful engagement of switch contacts 48 and 178, the resistance of pad 176 is lowered correspondingly. Therefore, the voltage applied through diode 182 which charges capacitor 66 is then applied via resistor 70 to the input 72 of comparator 88 will depend upon the amount of force applied to the manual brake switch. This, in turn, will cause narrower or wider pulses to be generated by comparator 88 and, therefore, will cause a greater or smaller amount of braking power to be applied to brake coils 114. Furthermore, NOR gate 40 has a low output whenever manual brake switch 18 is operated. Capacitor 66 also serves to filter noise picked up by the high impedance pad 176.

It should be noted that if either the backup lights of the towing vehicle or the brake lights are burned out, the brake control circuit will still be operative as the closure of switches 30 or 158 provide an indication of an activation of either the braking circuit of the towing vehicle or the reverse shifting of the vehicle regardless of the condition of lights 31 or 156.

It should also be noted when manual brake switch 18 is actuated, NOR gate 40 is disabled, thereby preventing application of brake force to the vehicle brakes by the brake activation detection circuit 14 and the towing vehicle brake pedal.

One advantage of the trailer brake control system according to the instant invention is that, when the driver is alerted to a short circuit or overload condition in the trailer, the short circuit is more easily diagnosed than with prior art brake control circuits. When LED 168 flashes, indicating a short circuit or overload condition, the driver first disconnects the trailer electrical circuit from the brake control circuit. If, upon actuation of the brake pedal, the indicator light 168 no longer flashes, this provides an indication that the short circuit occurred in the trailer brake system and not in the towing vehicle brake wiring system. On the other hand, if LED 168 continues to flash, this provides an indication that the short circuit is in the towing vehicle wiring system and not in the trailer wiring.

What has, therefore, been provided is a very simple yet effective circuit for controlling the brakes of a towed vehicle which provides a visible signal to the driver of the towing vehicle that a short circuit or overload condition exists in the wiring of the towing vehicle or trailer, and which indicates the amount of braking power which is being applied. The circuit also provides a pulse modulated drive for the vehicle brakes and automatically disengages the braking force when the vehicle is shifted into reverse. Furthermore, the amount of braking power provided may be compensated for trailer weight. The maximum amount of braking force applied will continue to be applied when the towing vehicle comes to a stop as long as the towing vehicle brake pedal continues to be depressed. Lastly, the brake control system is not affected by road grade.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A trailer brake control system for use in a trailer which is adapted to be towed by a towing vehicle, said trailer including an electrically operated brake mechanism, said towing vehicle including a brake pedal, at least one brake light, and a brake switch operated by said brake pedal to energize said brake light, the control system comprising:

first means responsive to a short circuit condition in said trailer brake mechanism for providing a short circuit signal;

manual switch means for manually actuating said trailer brake mechanism and for providing a manual brake actuation signal;

second means coupled to said first means and said manual switch means for providing a variable amplitude brake actuation signal in response to the closure of said brake switch;

disabling means coupled to said first means, said manual switch means, and said second means, responsive to said short circuit signal for disabling said second means, said disabling means disabling said second means in response to the presence of said manual brake actuation signal independently of the presence or absence of said short circuit signal;

indicator means coupled to said second means responsive to said brake actuation signal or providing a perceptible brake actuation indication signal;

oscillator means for providing a stream of sawtooth pulses;

voltage comparator means coupled to said oscillator means responsive to said stream of pulses and said variable amplitude brake actuation signal for providing a stream of variable width drive pulses; and switch means coupled to said voltage comparator means and said second means, responsive to said stream of variable width drive pulses to cyclically and repetitively actuate said trailer brake mechanism, thereby applying braking force to the brakes of said trailer.

2. The control system according to claim 1 wherein said first means is connected to said indicator means to provide a perceptible indication of an electrical short circuit condition in the trailer brake mechanism.

3. The control system according to claim 2 wherein said indicator means comprises a light and wherein said perceptible indication of a short circuit condition is the flashing of said light.

4. The control system according to claim 1 wherein said indicator means comprises an indicator light, and wherein the intensity of said indicator light varies in proportion to the applied brake actuation force.

5. The control system according to claim 1 wherein the amplitude of the brake actuation signal is gradually increased at a selected rate and including selective control means for selectively and dynamically adjusting said rate.

6. The control system according to claim 1 including selective compensation control means for selectively adjusting the amplitude of the brake actuation signal to compensate the braking force for the weight of said trailer.

7. The control system according to claim 1 wherein said disabling means comprises a NOR circuit responsive to a normal braking operation sensed by simultaneous indication of an absence of actuation of said manual brake actuator, an absence of a short circuit condition, and an indication of the operation of the brake pedal switch means, said NOR circuit for disabling said second means during periods when a normal braking operation is not sensed.

8. The control system according to claim 7 wherein said towing vehicle includes a reverse gear and backup lights associated therewith, in which:
said NOR circuit is responsive to an indication that said towing vehicle is in reverse gear for disabling said second means.

* * * * *